United States Patent
Sasaki

(10) Patent No.: US 7,474,037 B2
(45) Date of Patent: Jan. 6, 2009

(54) ACTUATOR AND LENS DRIVE APPARATUS

(75) Inventor: Ryota Sasaki, Saitama (JP)

(73) Assignee: Fujinon Corporation, Saitama (JP)

( * ) Notice: Subject to any disclaimer, the term of this patent is extended or adjusted under 35 U.S.C. 154(b) by 161 days.

(21) Appl. No.: 11/501,851

(22) Filed: Aug. 10, 2006

(65) Prior Publication Data
US 2007/0035206 A1    Feb. 15, 2007

(30) Foreign Application Priority Data
Aug. 12, 2005   (JP) .............................. 2005-234642

(51) Int. Cl.
*H01L 41/08* (2006.01)
(52) U.S. Cl. .................................. 310/323.02
(58) Field of Classification Search ............ 310/323.02, 310/323.12, 323.1, 6, 328
See application file for complete search history.

(56) References Cited

U.S. PATENT DOCUMENTS

| | | | | |
|---|---|---|---|---|
| 4,728,843 A | * | 3/1988 | Mishiro | ....................... 310/325 |
| 5,150,260 A | | 9/1992 | Chigira | |
| 5,548,175 A | * | 8/1996 | Tamai | .................... 310/323.12 |
| 6,984,920 B2 | * | 1/2006 | Yoon et al. | .............. 310/323.12 |
| 7,173,362 B2 | * | 2/2007 | Magnussen et al. | .... 310/323.02 |
| 7,253,552 B2 | * | 8/2007 | Miyazawa et al. | ...... 310/323.02 |
| 7,315,108 B2 | * | 1/2008 | Okamoto et al. | ........ 310/323.17 |
| 2004/0012304 A1 | | 1/2004 | Yoshida et al. | |

FOREIGN PATENT DOCUMENTS

| | | |
|---|---|---|
| EP | 0 464 764 A1 | 1/1992 |
| EP | 0 564 352 A1 | 10/1993 |
| EP | 1 605 290 A2 | 12/2005 |
| EP | 1 605 529 A1 | 12/2005 |
| JP | 2633066 B2 | 4/1997 |

* cited by examiner

*Primary Examiner*—Mark Budd
(74) *Attorney, Agent, or Firm*—Birch, Stewart, Kolasch & Birch, LLP

(57) ABSTRACT

An actuator is provided and includes: an electro-mechanical conversion element; a driving frictional member attached at one end of the electromechanical conversion element with respect to a direction of expansion and contraction of the electromechanical conversion element; and a driven member frictionally engaged with the driving frictional member. The driving frictional member has a rod-like shape, and a cross section of the driving frictional member orthogonal to a longitudinal direction thereof is changed along the longitudinal direction.

6 Claims, 6 Drawing Sheets

ACTUATOR AND LENS DRIVE APPARATUS

FIELD OF THE INVENTION

The present invention relates to actuators, and more particularly to an actuator that is to be mounted on a small-sized precision apparatus, such as a digital camera or a cellular phone, and for driving a zoom lens.

BACKGROUND OF THE INVENTION

There is an actuator using a piezoelectric element as a driver for a lens unit of a digital camera or the like. For example, the actuator in Japanese Patent No. 2,633,066 has a piezoelectric element whose one end is secured to a drive shaft while the other end is fixed to an apparatus body. On the drive shaft, a lens barrel is slidably supported. The lens barrel is frictionally engaged with the drive shaft through utilization of a biasing force of a leaf spring. A drive pulse nearly in a saw-tooth form is applied to the piezoelectric element, to cause a deformation in the piezoelectric element at a rate different between an expansion and contraction directions thereof. For example, in case the piezoelectric element deforms moderately, the lens barrel moves together with the drive shaft. Conversely, when the piezoelectric element deforms fast, the lens barrel stays in the same position due to the inertia of the mass thereof. Consequently, by repetitively applying to the piezoelectric element a drive pulse nearly in a saw-tooth waveform, the lens barrel can be moved intermittently at a fine pitch.

However, in the actuator of the background art, the moving rate of and thrust to the driven member changes depending upon the position of the driven member thus making it difficult to effect drive control with stability.

SUMMARY OF THE INVENTION

An object of an illustrative, non-limiting embodiment of the invention is to provide an actuator capable of taking a drive control with stability irrespectively of the position of the driven member.

(1) An actuator according to one aspect of the invention includes: an electromechanical conversion element; a driving frictional member attached at one end of the electro-mechanical conversion element with respect to a direction of expansion and contraction of the electro-mechanical conversion element, wherein the driving frictional member has a rod-like shape, and a cross section of the driving frictional member orthogonal to a longitudinal direction thereof is changed along the longitudinal direction; and a driven member frictionally engaged with the driving frictional member.

According to the actuator of the above (1), because the driving frictional member has a cross section of the driving frictional member orthogonal to a longitudinal direction thereof, the cross section changing in the longitudinal direction, the frictional force between the driving frictional member and the driven member varies in the axial direction (the longitudinal direction of the driving frictional member). Accordingly, the moving rate of and thrust to the driven member can be regulated in the longitudinal direction of the driving frictional member. This can suppress the moving rate of and thrust to the driven member from varying in the longitudinal direction of the driving frictional member, thus effecting a drive control with stability.

(2) The actuator according to the above (1), wherein the driving frictional member is substantially in a circular cylindrical form having a cross section circular in the longitudinal direction, a diameter of the cross section is changed in the longitudinal direction.

(3) The actuator according to the above (2), wherein the diameter of the circular shape is greater at an end than at a center of the driving frictional member.

(4) The actuator according to the above (2), wherein the diameter of the circular shape is smaller at an end than at a center of the driving frictional member.

(5) The actuator according to any one of the above (1) to (4), wherein the driven member is attached with a support frame of a zoom lens.

An actuator according to one aspect of the invention has a cross section orthogonal to an axis thereof (i.e., longitudinal direction of the driving frictional member), the cross section changing in an axial direction of the actuator. Accordingly, the driven member can be suppressed from varying in its moving distance, moving rate and thrust axially of the driving frictional member, thus effecting a drive control with stability.

DETAILED DESCRIPTION OF THE INVENTION

With reference to the accompanying drawings, description is now made in detail on an exemplary embodiment of an actuator according to the present invention.

Figure 1:
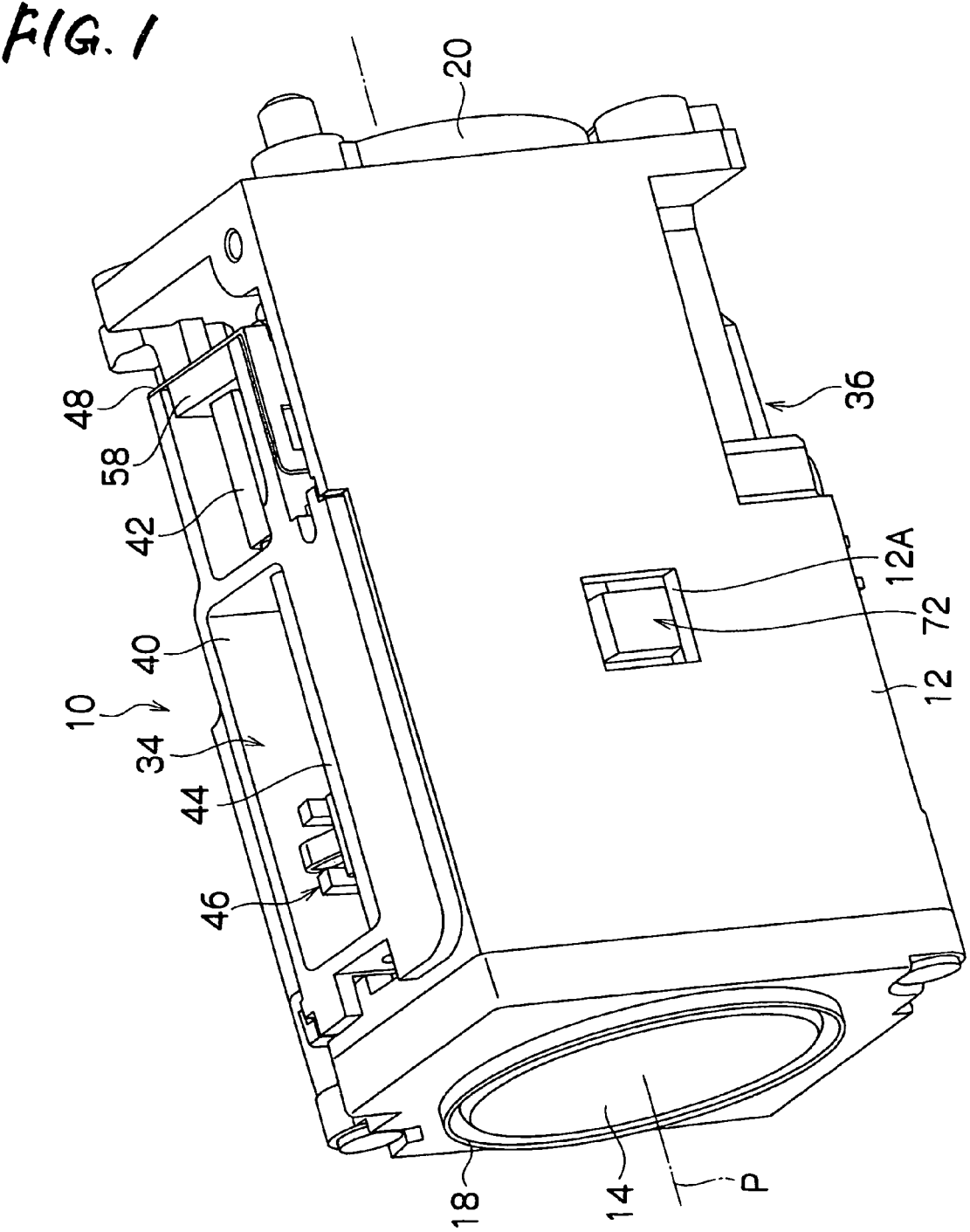
FIG. 1 is a perspective view showing a lens apparatus to which applied is an actuator according to an exemplary embodiment of the present invention.
Figure 2:
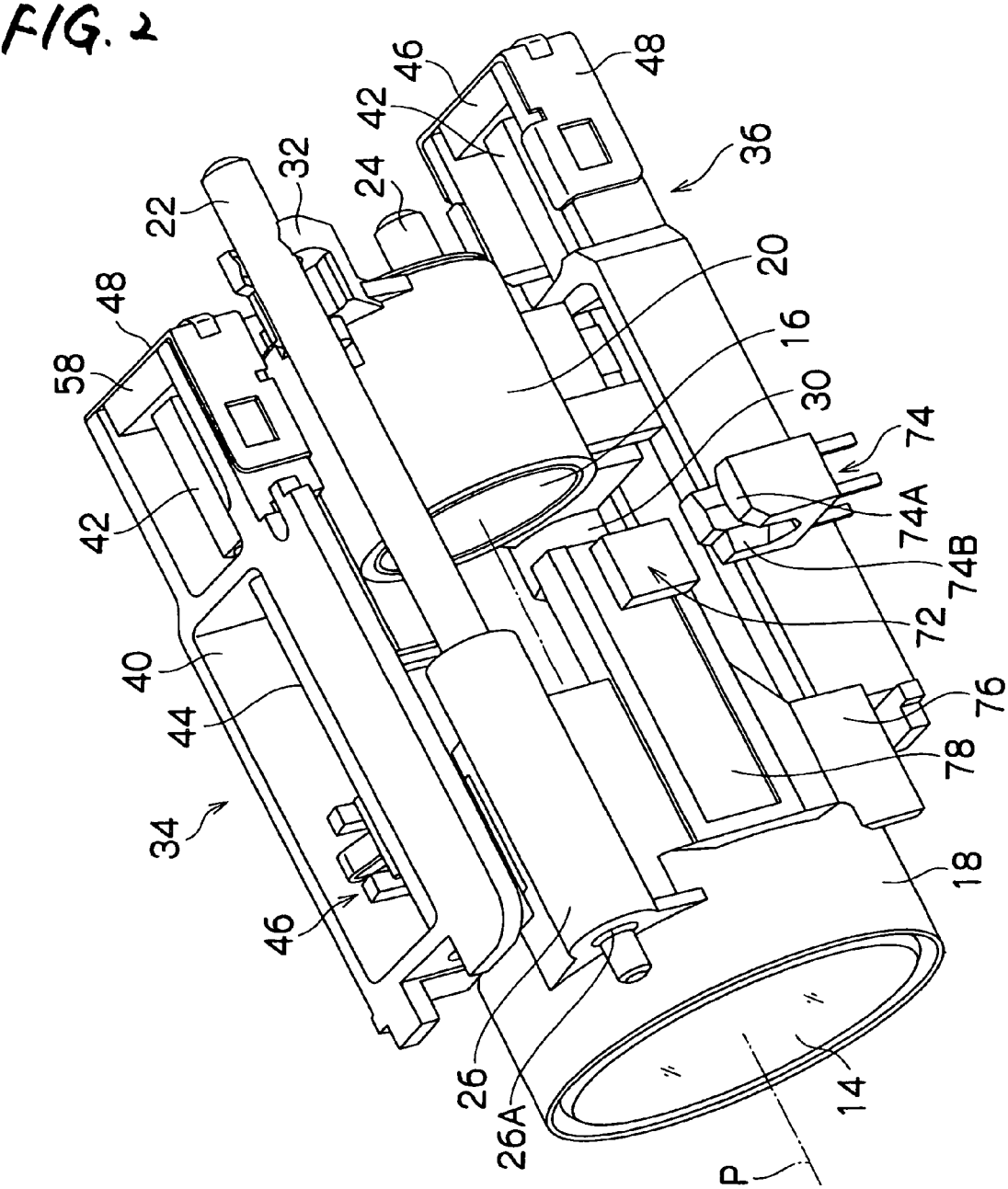
FIG. 2 is a perspective view showing an interior construction of the lens apparatus in FIG. 1.
Figure 3:
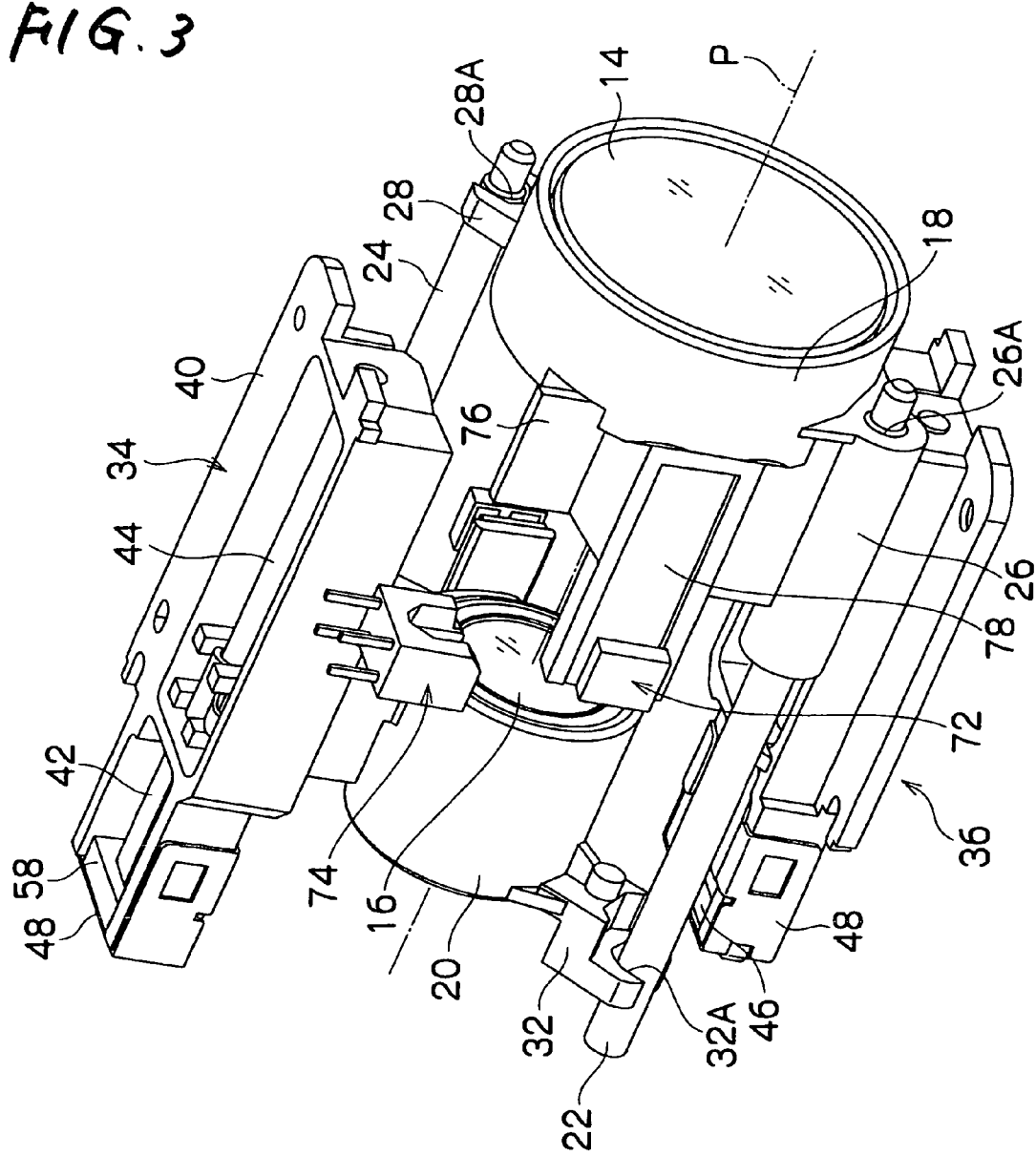
FIG. 3 is a perspective view of the lens apparatus as viewed in the different direction from FIG. 2.

FIG. 1 is a perspective view showing a lens apparatus 10 to which is applied an actuator according to an aspect of the invention. FIGS. 2 and 3 are perspective views showing an internal arrangement of the same.

As shown in FIG. 1, the lens apparatus 10 has a body 12 formed nearly rectangular in form. The body 12 has therein zoom lenses (groups) 14, 16 that are shown in FIGS. 2 and 3. Of the zoom lenses (groups) 14, 16, one is provided as a variable power lens while the other is as a correction lens. The zoom lenses (groups) 14, 16 are respectively held in support frames 18, 20. The support frames 18, 20 are supported slidable in the direction of an optical axis P by two guide rods 22, 24. The two guide rods 22, 24 are arranged diagonal in the body 12 and parallel with the optical axis P, thus being fixed on the body 12.

The support frame 18 has a guide 26 having a bore in which the guide rod 22 is inserted and a U-groove 28A with which the guide rod 24 is engaged. Due to this, the guide frame 18 is to be guided over the two guide rods 22, 24 so that the zoom lens (group) 14 can be held movable in the optical-axis P direction. Likewise, the support frame 20 for the zoom lens 16 has a guide 30 having an insert bore (not shown) in which the guide rod 24 is inserted and an engager 32 having a U-groove 32A with which the guide rod 22 is engaged. Due to this, the guide frame 20 is to be guided over the two guide rods 22, 24 so that the zoom lens (group) 16 can be held movable in the optical-axis P direction.

The zoom lenses (groups) 14, 16 are driven in the optical-axis P direction respectively by the actuators 34, 36. The actuators 34, 36 are arranged on the opposite surfaces of the body 12. Specifically, the actuator 34 for the zoom lens (group) 14 is arranged on the top surface of the FIG. 1 body 12 while the actuator 36 for the zoom lens (group) 16 is on the bottom surface of the body 12. The explanation in the following is on the actuator 34, which is the case with the actuator 36.

Incidentally, reference numerals 72, 74 in FIGS. 1 to 3 designate position detectors which are to detect a position of the support frame 18, 20. The position detector 72, or reflective photo-interrupter, is arranged opposite to a plate-like reflector unit 78 integrally formed with the support frame 18 (or the support frame 20) so that it can be fixedly received in an aperture 12A of the body 12 (see FIG. 1). In the reflector unit 78, a plurality of reflectors (not shown) are arranged at a constant interval in the drive direction. Consequently, by receiving the reflection of the light emitted from the position detector 72 to the reflector unit 78 and detecting a change in the amount of that light, it is possible to detect a moving amount of the reflector unit 78 (i.e. support frame 18, 20). Meanwhile, the position detector 74 has a light emitter 74A and a light receiver 74B. Between the light emitter 74A and the light receiver 74B, a plate-like shade 76 is to be inserted which is integrally formed with the support frame 18 (or support frame 20). Consequently, due to an insertion of the shade 76 between the light emitter 74A and the light receiver 74B, the light receiver 74B is to receive a changing amount of light. This makes it possible to detect a fact the shade 76 (i.e. support frame 18, 20) has moved to a predetermined point. In this manner, the position detector 74 detects a reference position of the support frame 18, 20 while the position detector 72 detects a moving amount of the support frame 18, 20, making it possible to determine a position of the support frame 18, 20 correctly. The actuators 34, 36 are controlled and driven depending upon the value as measured by the position detector 72, 74.

Figure 4:
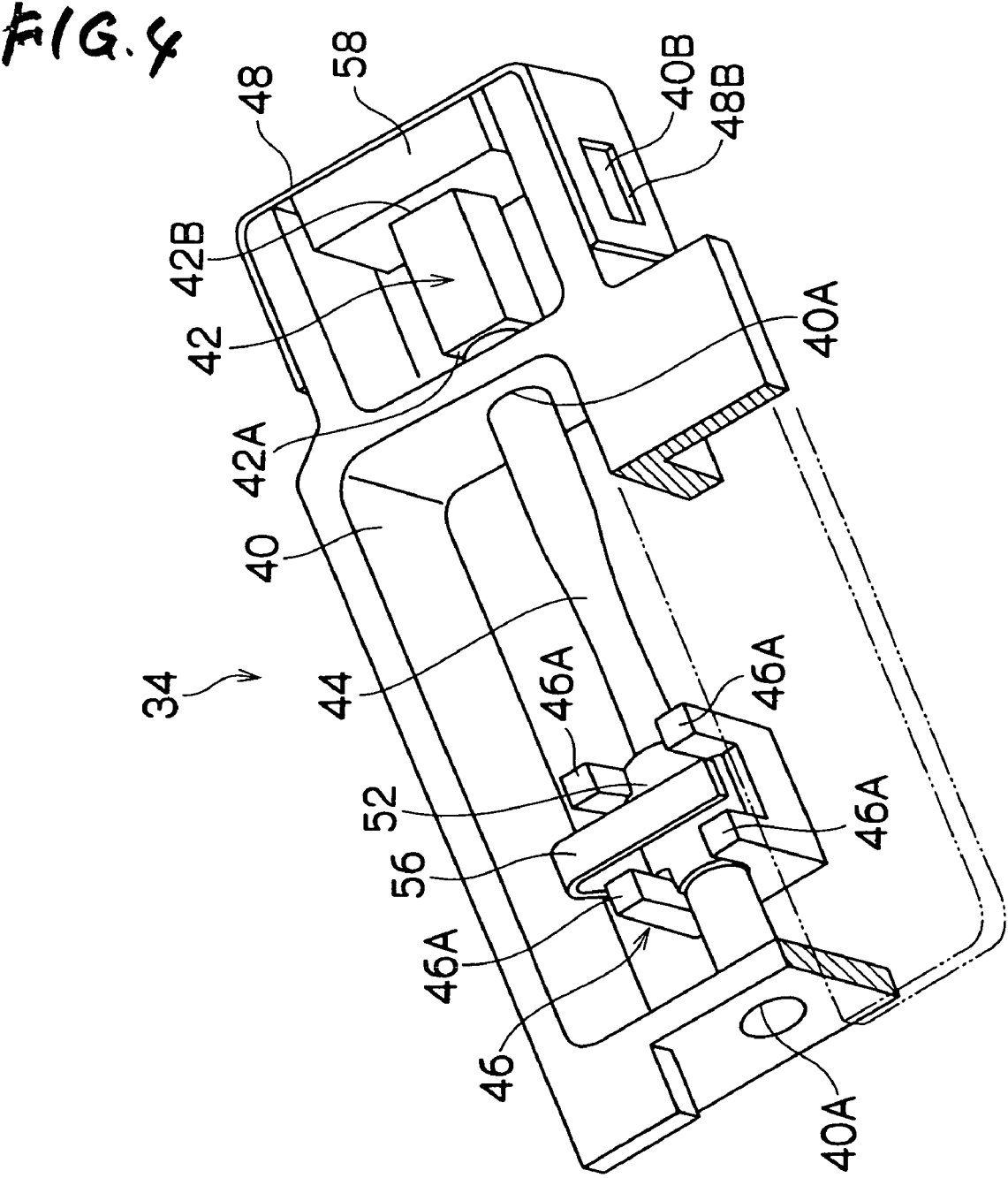
FIG. 4 is a perspective view showing a construction of an actuator.

FIG. 4 is a perspective view showing an arrangement of the actuator 34. As shown in the figure, the actuator 34 is mainly constructed with a fixed frame 40, a piezoelectric element (corresponding to an electromechanical conversion element) 42, a drive shaft (corresponding to a driving frictional member) 44, a coupling piece (corresponding to a driven member) 46 and a fixture 48. The fixed frame 40 is secured to the body 12 for the FIG. 1 lens apparatus 10.

The piezoelectric element 42 is formed laminated in the optical-axis P direction (hereinafter referred to as a drive direction), thus being structured to deform (expand and contract) in the drive direction due to the application of voltage. Accordingly, by applying a voltage to the piezoelectric element 42, its lengthwise end faces 42A, 42B make a displacement in the drive direction.

Of the end faces 42A, 42B of the piezoelectric element 42, one end face 42A is secured to a base of the drive shaft 44 while the other end face 42B is fixed, by bonding, to a weight member 58 formed of non-rigid material.

The weight member 58 is to impart a load to the end face 42B, thereby preventing the displacement of the end face 42B greater than that of the end face 42A. Accordingly, the weight member 58 is preferably greater in weight than the drive shaft 44. The weight member 58 uses a material smaller in Young's modulus than the piezoelectric element 42 and drive shaft 44, e.g. structured of a material having 300 MPa or smaller. For example, the weight member 58 is formed of a urethane rubber, a urethane resin or the like, and made by mixing such a rubber or resin with a metal powder, such as of tungsten, in order to raise the specific gravity. The specific gravity of the weight member 58 is preferably as high as possible for the sake of size reduction, e.g. set at 8-12 or the around.

The weight member 58 is bonded to the fixture 48, at a side opposite to the piezoelectric element 42. The fixture 48 is formed by bending a metal sheet into a squared-U form, thus being formed with apertures 48B in its bent regions at both ends. The fixture 48 is attached to the fixed frame 40 by being fitted at the apertures 48B over the projections 40B of the fixed frame 40. Due to this, the piezoelectric element 42 is held in the fixed frame 40 through the weight member 58 and fixture 48.

The piezoelectric element 42 is held displaceable at its end face 42B in the drive direction. Namely, the end face 42B of the piezoelectric element 42 is allowed to displace through an expansion and contraction of the non-rigid weight member 58 or a deflection of the fixture 48.

Meanwhile, the drive shaft 44, secured to the end face 42A of the piezoelectric element 42, is formed in a rod form and arranged to have an axis thereof aligned in the drive direction. The drive shaft 44 is inserted in and guided by two bores 40A, 40A formed in the fixed frame 40, thus being supported slidable in the axial direction. The drive shaft 44 uses, as a material, graphite crystal complex that graphite crystal is firmly combined together, e.g. carbon graphite.

Figure 7:
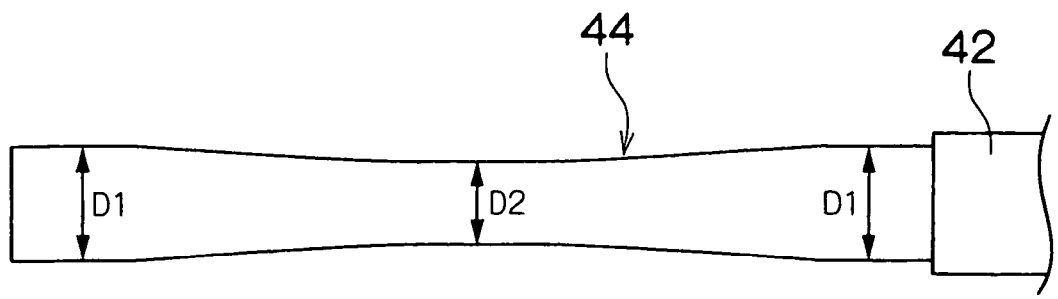
FIG. 7 is a front view showing a drive shaft.

The drive shaft 44 is formed circular in a cross-section orthogonal to the axis such that the cross-section varies in diameter axially thereof. Specifically, the drive shaft 44 is formed such that the diameter D2 at both ends is greater than the diameter D2 at the center, as shown in FIG. 7.

As shown in FIG. 4, the drive shaft 44 is engaged with the coupling piece 46. The coupling piece 46 is connected to the support frame 18 of the zoom lens 14 so that it can slide together with the support frame 18 in the optical-axis P direction (in the drive direction). Meanwhile, the coupling piece 46 is formed in a rectangular-parallelepiped form to have projections 46A, 46A protruding upward at four corners thereof.

Figure 5:
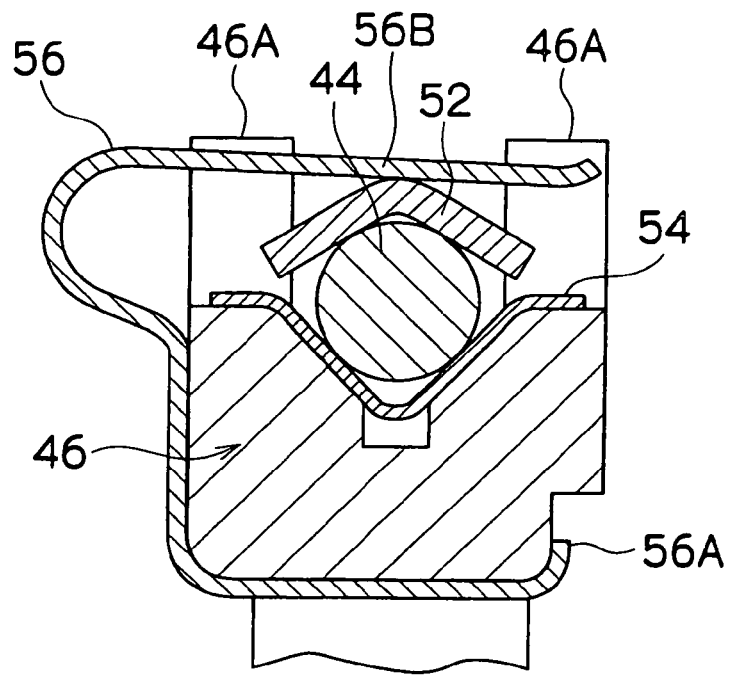
FIG. 5 is a sectional view showing a connection between the drive shaft and the coupling piece.

FIG. 5 is a sectional view of a connection between the coupling piece 46 and the drive shaft 44. As shown in the figure, first and second slide members 52, 54 are provided at the connection between the coupling piece 46 and the drive shaft 44. The first slide member 52 is arranged above the drive shaft 44 while the second slide member 54 is below the drive shaft 44. The first and second slide members 52, 54 are provided to stably obtain a frictional force between the coupling piece 46 and the drive shaft 44, and formed of stainless steel, for example.

The second slide member 54 is formed in a V-form and fixed on the coupling piece 46. Meanwhile, the first slide member 52 is formed in an inverted V-form and arranged in a region surrounded by the four projections 46a, 46A . . . , of the coupling piece 46. The first slide member 52 has cutouts at respective corners matched to the projections 46a, 46A . . . , of the coupling piece 46. This prevents the first slide member 52 from falling out of the coupling piece 46 when arranging the first slide member 52 in a region surrounded by the projections 46A, 46A . . . .

The coupling piece 46 is attached with a pressure spring 56. The pressure spring 56 is made by bending a metal sheet and attached on the coupling piece 46 by engaging its claw 56A with the lower region of the coupling piece 46. Meanwhile, the pressure spring 56 has a presser 56B arranged above the first slide member 52 so that the presser 56B pushes the first slide member 52 down. This places the drive shaft 44 in a state clamped by the first and second slide members 52, 54. Thus, the coupling piece 46 is frictionally engaged with the drive shaft 44 through the first and second slide members 52, 54. Incidentally, the frictional force between the coupling piece 46 and the drive shaft 44 is provided greater than a drive force caused upon applying a drive pulse with a moderate voltage change to the piezoelectric element 42 but smaller than a drive force caused upon applying a drive pulse with an abrupt voltage change to the piezoelectric element 42. In such a case, the frictional force (slide resistance) is preferably of from 10 gf to 30 gf, more preferably from 15 gf to 25 gf.

Figure 6A:
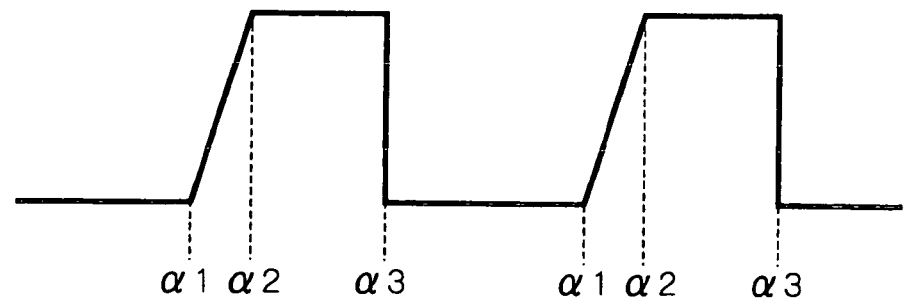
FIGS. 6A and 6B are figures showing examples of a voltage drive pulse to be applied to a piezoelectric element.
Figure 6B:
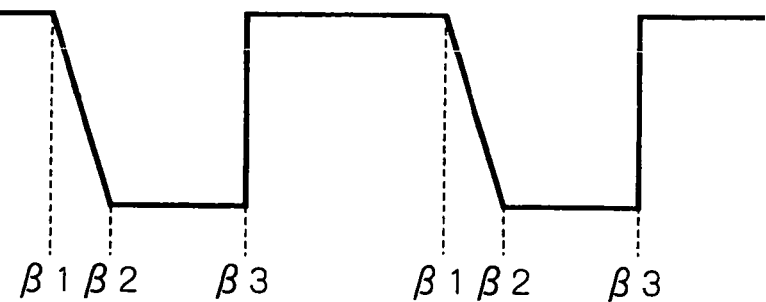

A drive pulse voltage, shown in FIGS. 6A and 6B, is applied to the piezoelectric element 42. FIG. 6A depicts a drive pulse for driving the FIG. 4 coupling piece 46 toward the left while FIG. 6B a drive pulse for driving the FIG. 4 coupling piece 46 toward the right.

In the case of FIG. 6A, applied to the piezoelectric pulse 42 is a drive pulse nearly in a saw-tooth form that rises moderately at time from α1 to α2 and abruptly falls at time α3. Accordingly, the piezoelectric element 42 expands moderately in time of α1 to α2. In this duration, because the drive shaft 44 moves at a moderate rate, the coupling piece 46 moves together with the drive shaft 44. This can move the FIG. 4 coupling piece 46 toward the left. At time α3, the piezoelectric element 42 contracts abruptly, and accordingly the drive shaft 44 moves toward the right. In this duration, because of an abrupt movement of the drive shaft 44, only the drive shaft 44 moves while the coupling piece 46 stays in the position due to its inertia. Accordingly, by repetitively applying the saw-tooth drive pulse shown in FIG. 6A, the FIG. 4 coupling piece 46 repeats the leftward movement and rest, thus being moved toward the left.

In the case of FIG. 6B, applied to the piezoelectric pulse 42 is a drive pulse nearly in a saw-tooth form that falls moderately at time from β1 to β2 and abruptly rises at time β3. Accordingly, the piezoelectric element 42 contracts moderately in time of β1 to β2. In this duration, because the drive shaft 44 displaces moderately, the coupling piece 46 moves together with the drive shaft 44. This can move the FIG. 4 coupling piece 46 toward the right. At time β3, the piezoelectric element 42 expands abruptly, and accordingly the drive shaft 44 moves toward the left. In this duration, because of an abrupt movement of the drive shaft 44, only the drive shaft 44 moves while the coupling piece 46 stays in the position due to its inertia. Accordingly, by repetitively applying the saw-tooth drive pulse shown in FIG. 16(B), the FIG. 4 coupling piece 46 repeats the rightward movement and rest, thus being moved toward the right.

The operation of the actuator 34 thus constructed is now explained.

As described so far, the coupling piece 46 and support frame 18 is moved along the drive shaft 44 by driving the actuator 34. In such a case, the conventional actuator (i.e. actuator whose drive shaft 44 is formed at a constant diameter) encounters a problem that the coupling piece 46 suffers a significant change in its moving rate and thrust as the coupling piece 46 moves. Thus, there is involved a problem that drive control is impossible to perform with stability. This is because of the reason that, when the piezoelectric element 42 is expanded and contracted, slight twist and stain takes place in the drive shaft 44 thus resulting in a non-uniform displacement over the entire drive shaft. As a result, where the coupling piece 46 is in a tip or base position over the drive shaft 44, there encounters a problem of insufficient moving rate of or thrust to the coupling piece 46 as compared to the case it is positioned at the center of the drive shaft 44.

Therefore, in this embodiment, the drive shaft 44 has a diameter made greater at the both ends than at the center so that the frictional force between the coupling piece 46 and the drive shaft 44 increases at the both ends of the drive shaft 44. The coupling piece 46 is to move at a sufficient moving rate and thrust. Accordingly, even when the coupling piece 46 is in a tip or base position over the base shaft 44, the moving rate and thrust can be obtained nearly equal to that of the case it is in a center position of the drive shaft 44. This enables drive control to be effected stably without relying upon the position of the coupling piece 46.

Figure 8A:
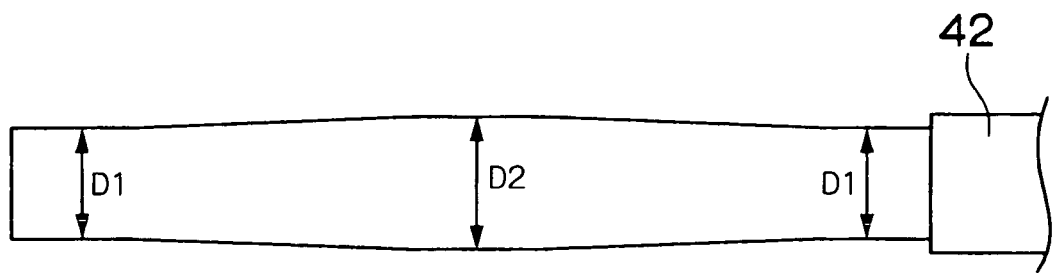
FIGS. 8A and 8B are front views showing drive shafts having forms different from FIG. 7.
Figure 8B:
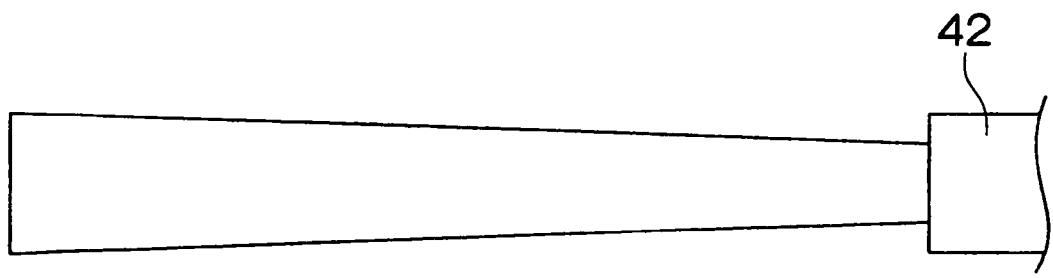

Incidentally, the embodiment formed the drive shaft 44 with a diameter greater at the both ends than at the center. However, this is not limitative for the form of the drive shaft 44. Namely, it is satisfactory to provide a form that the frictional force (slide resistance) between the drive shaft 44 and the coupling piece 46 varies naturally in the longitudinal direction of the drive shaft 44. Therefore, the drive shaft 44 may be formed such that the diameters D2 at the center of the drive shaft 44 is greater than the diameter D1 at the both ends, as shown in FIG. 8A for example. Otherwise, the drive shaft 44 may be formed with a diameter greater as the tip of the drive shaft 44 is neared, as shown in FIG. 8B.

Meanwhile, the embodiment structured the drive shaft 44 in a manner to move the coupling piece 46 nearly at a constant moving rate and thrust. However, this is not limitative but the drive shaft 44 may be structured to increase the moving rate of and thrust to the coupling piece 46 in a part of the drive shaft 44. Where to partially increase the moving rate of the coupling piece 46, the drive shaft 44 is made with a diameter decreased in the relevant portion thereby decreasing the frictional force (slide resistance) there. Meanwhile, where to partially increase the thrust to the coupling piece 46, the drive shaft 44 is made with a diameter increased in the relevant portion thereby increasing the frictional force (slide resistance) there. By thus changing the diameter of the drive shaft 44 lengthwise, the moving rate of and thrust to the coupling piece 46 can be regulated.

Incidentally, the material of the weight member 58 is not limited to the non-rigid material mentioned before but may use a rigid material. However, the use of a non-rigid material is preferred in respect of the following point. Namely, the use of a weight member 58 of a non-rigid material lowers the resonant frequency of a system formed by the piezoelectric element 42, the driving frictional member 44 and the weight member 58. The lowering in the resonant frequency reduces the effect due to the variation in the structure of the piezoelectric element 42, the driving frictional member 44 and the weight member 58, thus obtaining a stable drive force. Meanwhile, by lowering the resonant frequency $f_0$, drive frequency f can be easily set within an anti-vibrating region of $f \geq 2^{1/2} \cdot f_0$ wherein the effect of resonance is reduced to provide a stable drive force. This can positively convey, to the driven member, the drive force caused by an expansion and contraction of the piezoelectric element 42, thus correctly moving the driven member in the direction of expansion and contraction of the piezoelectric element 42. Furthermore, because the resonant frequency $f_0$ is decreased to reduce the effect of resonance, actuator-support position and method can be desirably selected. For example, the actuator can be held on the end face 42A or side surface of the piezoelectric element 42 or on the side surface or end face of the drive shaft 44.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. 2005-234642 filed Aug. 12 of 2005, the contents of which are incorporated herein by reference.

What is claimed is:

1. An actuator comprising:
an electro-mechanical conversion element;
a driving frictional member attached at one end of the electro-mechanical conversion element with respect to a direction of expansion and contraction of the electro-mechanical conversion element, wherein the driving frictional member has a rod-like shape, and a cross section of the driving frictional member orthogonal to a longitudinal direction thereof is changed along the longitudinal direction; and
a driven member frictionally engaged with the driving frictional member, wherein
the electro-mechanical conversion element causes the driven member to move in opposing longitudinal directions along the rod-like shaped driving frictional member.

2. The actuator according to claim 1, wherein the cross section of the driving frictional member has a circular shape, and a diameter of the circular shape is changed in the longitudinal direction.

3. The actuator according to claim 2, wherein the diameter of the circular shape is greater at an end than at a center of the driving frictional member.

4. The actuator according to claim 2, wherein the diameter of the circular shape is smaller at an end than at a center of the driving frictional member.

5. The actuator according to claim 1, wherein the driven member is attached with a support frame of a zoom lens.

6. A lens drive apparatus comprising an actuator according to claim 1.

* * * * *